(12) United States Patent
Inagawa et al.

(10) Patent No.: US 6,547,698 B2
(45) Date of Patent: Apr. 15, 2003

(54) CONTROL SYSTEM FOR AUTOMATIC VEHICLE TRANSMISSIONS

(75) Inventors: Yasushi Inagawa, Wako (JP); Satoshi Kato, Wako (JP); Masahide Saito, Wako (JP); Masamitsu Fukuchi, Wako (JP); Yoshikazu Nemoto, Wako (JP); Yoshiharu Saito, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/983,158

(22) Filed: Oct. 23, 2001

(65) Prior Publication Data

US 2002/0046617 A1 Apr. 25, 2002

(30) Foreign Application Priority Data

Oct. 24, 2000 (JP) ........................................ 2000-324145

(51) Int. Cl.[7] .............................................. F16H 61/04
(52) U.S. Cl. ...................................... 477/160; 74/336 R
(58) Field of Search ................................ 477/125, 160; 74/336 R, 335

(56) References Cited

U.S. PATENT DOCUMENTS 5,505,100 A * 4/1996 Mitchell et al. ............. 74/335
6,102,830 A * 8/2000 Tsustui et al. ............. 477/156
6,259,984 B1 * 7/2001 Kanzaki et al. ............. 701/51
6,385,520 B1 * 5/2002 Jain et al. .................... 701/51

FOREIGN PATENT DOCUMENTS

JP          10-153259          6/1998

\* cited by examiner

*Primary Examiner*—Sherry Estremsky
(74) *Attorney, Agent, or Firm*—Arent Fox Kintner Plotkin & Kahn, PLLC

(57) ABSTRACT

A system for controlling an automatic transmission of a vehicle, wherein if the change of the destined gear GB (i.e., the target gear SH) is required when the jumping shift, i.e., two-gear downshifting is in progress, the input/output rotational speed ratio GRATIO (indicative of degree of shift progress) is compared with the predetermined input/output rotational speed ratio #GRCN312 or #GRCN423, and based on the result of comparison, how the shift to establish or effect the required destined gear GB, i.e., the shift mode QATNUM is determined, thereby enabling to improve or enhance the response to the change of the destined gear GB during two-gear downshifting. It can also prevent the clutch from being degraded in such a shifting.

10 Claims, 9 Drawing Sheets

CONTROL SYSTEM FOR AUTOMATIC VEHICLE TRANSMISSIONS

BACKGROUND OF THE INVENTION

1. Field of the Invention

This invention relates to a control system for automatic vehicle transmissions.

2. Description of the Related Art

Among others the assignee proposes, in Japanese Laid-Open Patent Application No. Hei 10 (1998)-153,259, a control system for automatic vehicle transmissions. In the proposed system, when the gear is being shifted from the gear (currently engaged) to a destined gear (to be shifted or engaged to next), if the change of the destined gear is required, its change is inhibited or prohibited unless a predetermined condition is met, so as to prevent unpleasant shock which the vehicle occupant would otherwise experience when the destined gear is changed during shift.

More specifically, it is determined in the system whether an input/output rotational speed ratio (indicative of the degree of shift progress which is one of the shift control parameters) has been determined accurately and if not, the change of the destined gear is inhibited. With this, the system aims to suppress the unpleasant shock which is liable to occur when the destined gear is changed during shift.

From a standpoint of improving response, it will be preferable, needless to say, to control shift such that the changed destined gear is immediately established. However, if the change of the destined gear is required when the shift is in progress to a certain degree, for example, when the hydraulic (oil) pressure being supplied to the clutch has reached a level under which the initially destined gear is almost engaged, the destined gear change will cause the slippage time to be longer and hence, to degrade the clutch. In addition, this will generate continuous torque fluctuation and give unpleasant feeling to the vehicle occupant.

Further, the control in change of the destined gear during a jumping shift such as a two-gear downshifting, such as a two-gear downshifting from 4th to 2nd has not been discussed in the prior art and the response to the change of the destined gear at that situation is not always satisfactory.

BRIEF SUMMARY OF THE INVENTION

An object of this invention is therefore to overcome the aforesaid problems and to provide a control system for automatic vehicle transmissions, which can effectively conduct the change of a destined gear when the shift is in progress, in particular, when a two-gear downshifting is in progress, thereby enabling to improve the response to the change of the destined gear and feeling experienced by the vehicle occupant, while preventing the clutch from being degraded.

In order to achieve the objects, there is provided a system for controlling an automatic transmission of a vehicle having an input shaft connected to an internal combustion engine mounted on the vehicle and an output shaft connected to driven wheels of the vehicle, the transmission transmitting input torque, through any of frictional engaging elements, generated by the engine and inputted by the input shaft to the driven wheels by the output shaft, comprising; destined gear retrieving means for retrieving a destined gear to be engaged to in accordance with predetermined shift scheduling map based on detected operating conditions of the vehicle and the engine in response to a shift command; shift mode determining means for determining a shift mode based on the destined gear and a current gear currently engaged, such that the destined gear is established; hydraulic pressure command value determining means for determining hydraulic pressure command value to be supplied to any of the frictional engaging elements based on the determined shift mode; degree of shift progress detecting means for detecting a degree of shift progress in shifting from the current gear to the destined gear; destined gear change possibility determining means for determining, if the shifting from the current gear to the destined gear is downshifting, whether change of the destined gear is possible when the downshifting is in progress, by comparing the degree of shift progress with a predetermined first threshold value; destined gear change permission determining means for determining a permission of the change of the destined gear when the change of the destined gear is determined to be possible; and destined gear determining means for determining the destined gear based on the permission of the change of the destined gear, wherein the shift mode determining means includes: second threshold value comparing means for comparing the degree of shift progress with a predetermined second threshold value, when the downshifting is two-gear downshifting; and determines the shift mode such that the destined gear is established in an upshifting direction.

BRIEF DESCRIPTION OF THE DRAWINGS

This and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
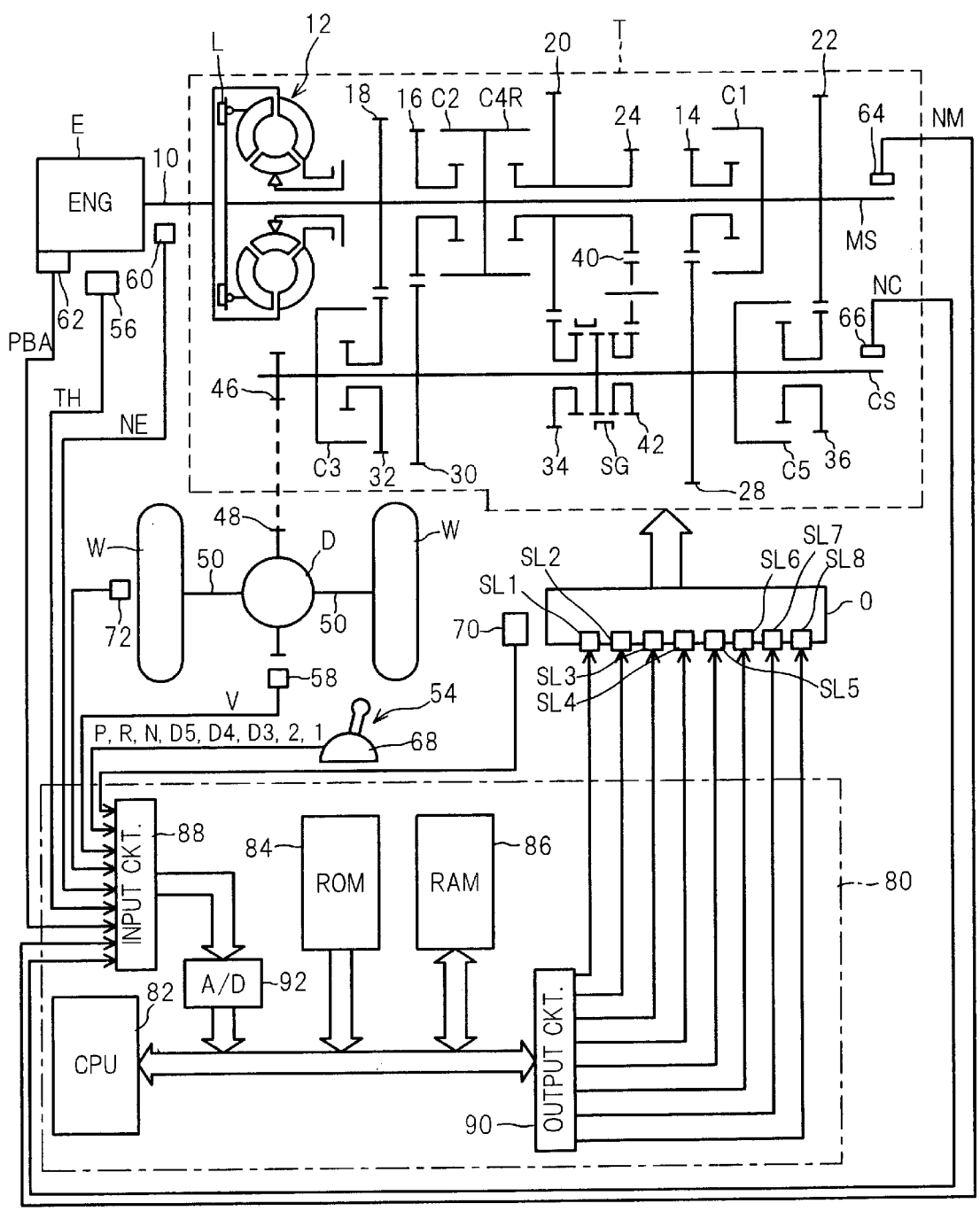
FIG. 1 is an overall schematic view of a control system for automatic vehicle transmissions according to the invention.

FIG. 1 is an overall schematic view of a control system for automatic vehicle transmissions according to the invention.

As shown in FIG. 1, a vehicle 1, illustrated partially by a driven wheel W (referred to later), etc., has an internal combustion engine E (referred to simply as "engine") mounted thereon and an automatic vehicle transmission T (referred to simply as "transmission"). The transmission T comprises the type of parallel-installed-shafts of five forward speeds.

Specifically, the transmission T is equipped with a main shaft (transmission input shaft) MS connected to a crankshaft 10 of the engine E through a torque converter 12 having a lockup mechanism L, and a countershaft CS provided in parallel with the main shaft MS. These shafts carry gears.

More specifically, the main shaft MS carries a main first gear 14, a main second gear 16, a main third gear 18, a main fourth gear 20, a main fifth gear 22 and a main reverse gear 24. The countershaft CS carries a counter first gear 28 which meshes with the main first gear 14, a counter second gear 30 which meshes with the main second gear 16, a counter third gear 32 which meshes with the main third gear 18, a counter fourth gear 34 which meshes with the main fourth gear 20, a counter fifth gear 36 which meshes with the main fifth gear 22 and a counter reverse gear 42 which meshes with the main reverse gear 24 through a reverse idle gear 40.

In the above, 1st gear (first speed or gear ratio) is established or effected when the main first gear 14 rotatably mounted on the main shaft MS is engaged with the main shaft MS by a first-gear hydraulic clutch C1. 2nd gear (second speed or gear ratio) is established when the main second gear 16 rotatably mounted on the main shaft MS is engaged with the main shaft MS by a second-gear hydraulic clutch C2. 3rd gear (third speed or gear ratio) is established when the counter third gear 32 rotatably mounted on the countershaft CS is engaged with the countershaft CS by a third-gear hydraulic clutch C3.

4th gear (fourth speed or gear ratio) is established when the counter fourth gear 34 rotatably mounted on the countershaft CS is engaged with the countershaft CS by a selector gear SG and with this state maintained, the main fourth gear 20 rotatably mounted on the main shaft MS is engaged with the main shaft MS by a fourth-gear/reverse hydraulic clutch C4R. 5th gear (fifth speed or gear ratio) is established when the counter fifth gear 36 rotatably mounted on the countershaft CS is engaged with the countershaft CS by a fifth-gear hydraulic clutch C5.

The reverse gear is established when the counter reverse gear 42 rotatably mounted on the countershaft CS is engaged with the countershaft CS by the selector gear SG and with this state maintained, the main reverse gear 24 rotatably mounted on the main shaft MS is engaged with the main shaft MS by the fourthgear/reverse hydraulic clutch C4R.

The rotation of the countershaft CS is transmitted through a final drive gear 46 and a final driven gear 48 to a differential D, from where it is transmitted to the driven wheels W, through left and right drive shafts 50, 50 of the vehicle 1 on which the engine E and the transmission T are mounted.

A shift lever 54 is installed on the vehicle floor near the operator's seat to be manipulated by the vehicle operator to select one from among eight positions P, R, N, D5, D4, D3, 2 and 1.

A throttle position sensor (engine load detecting means) 56 is provided in the air intake pipe (not shown) of the engine E at a point in the vicinity of a throttle valve (not shown) and generates a signal indicative of the degree of throttle valve opening TH. A vehicle speed sensor 58 is provided in the vicinity of the final driven gear 48 and generates a signal indicative of the vehicle traveling speed V once when the final driven gear 48 rotates for predetermined angles.

A camshaft sensor 60 is provided in the vicinity of the camshaft (not shown) of the engine E and generates a CYL signal once every a predetermined crank angular position of a predetermined cylinder, a TDC signal at a predetermined crank angular position of each cylinder and a CRK signal at a predetermined crank angular position (such as 15 crank angles) obtained by dividing the interval between the TDC signals. A manifold absolute pressure sensor 62 is installed in the air intake pipe of the engine E at a point in the vicinity of the throttle valve and generates a signal indicative of the manifold absolute pressure PBA indicative of the engine load.

A first rotational speed sensor 64 is provided in the vicinity of the main shaft MS and generates a signal indicative of the input rotational speed Nm of the transmission input shaft from the rotation of the main shaft MS. A second rotational speed sensor 66 is provided in the vicinity of the countershaft CS and generates a signal indicative of the output rotational speed Nc of the transmission output shaft from the rotation of the countershaft CS.

A shift lever position switch 68 is provided in the vicinity of the shift lever 54 and generates a signal indicating which of the aforesaid eight positions is selected by the vehicle operator. An oil temperature sensor 70 is installed in the transmission T or at an appropriate location close thereto and generates a signal indicative of the oil temperature, i.e., the temperature TATF of Automatic Transmission Fluid. And a brake switch 72 is provided in the vicinity of a brake pedal (not shown) and generates an ON signal when the brake pedal is depressed by the vehicle operator.

The outputs of the sensors 56, etc., are sent to an ECU (electronic control unit) 80. The ECU is constituted as a microcomputer comprising a CPU (central processing unit) 82, a ROM (read-only memory) 84, a RAM (random access memory) 86, an input circuit 88, an output circuit 90 and an A/D converter 92. The outputs of the sensors 56, etc., are inputted to the microcomputer from the input circuit 88.

The analog outputs of the sensors are converted into digital values through the A/D converter 92 and are stored in the RAM 86, while the digital outputs of the sensors are processed by a processing circuit such as a wave-form shaper (not shown).

The outputs of the vehicle speed sensor 58 and the CRK signal outputted by the crank angle sensor 60 are inputted to a counter (not shown) to be counted to determine the vehicle speed V and the engine speed NE. Similarly, the outputs of the first and second rotational speed sensors 64, 66 are counted by the counter to determine the input rotational sped Nm and the output rotational speed Nc of the transmission T.

The CPU 82 of the microcomputer determines the destined gear or the target gear (gear ratio) to be shifted to and energizes/deenergeizes shift solenoids SL1 to SL5 (each comprises an electromagnetic solenoid) of a hydraulic pressure control circuit O, through the output circuit 90 and a voltage pressure circuit (not shown), to control the supply of the hydraulic pressure to the clutches such that the shift is effected, and energizes/deenergizes linear solenoids SL6 to SL8 (each comprises an electromagnetic solenoid) to control the operation of the lockup clutch L of the torque converter 12 and the respective clutches. Specifically, the linear solenoid SL6 regulates the supply of oil to the lockup clutch L, the clutches C1, C2 and C4R. The linear solenoid SL7 regulates the supply of oil to the clutches C2 and C4R and the linear solenoid SL8 regulates the clutches C3 and C5. The supply of oil to some clutches are thus regulated by two solenoids such that one of the two solenoids are selected based on a shift mode explained below. Since the gist of the present invention does not reside in it, further explanation will be omitted.

The operation of the control system of an automatic vehicle transmission according to the invention will be explained.

Figure 2:
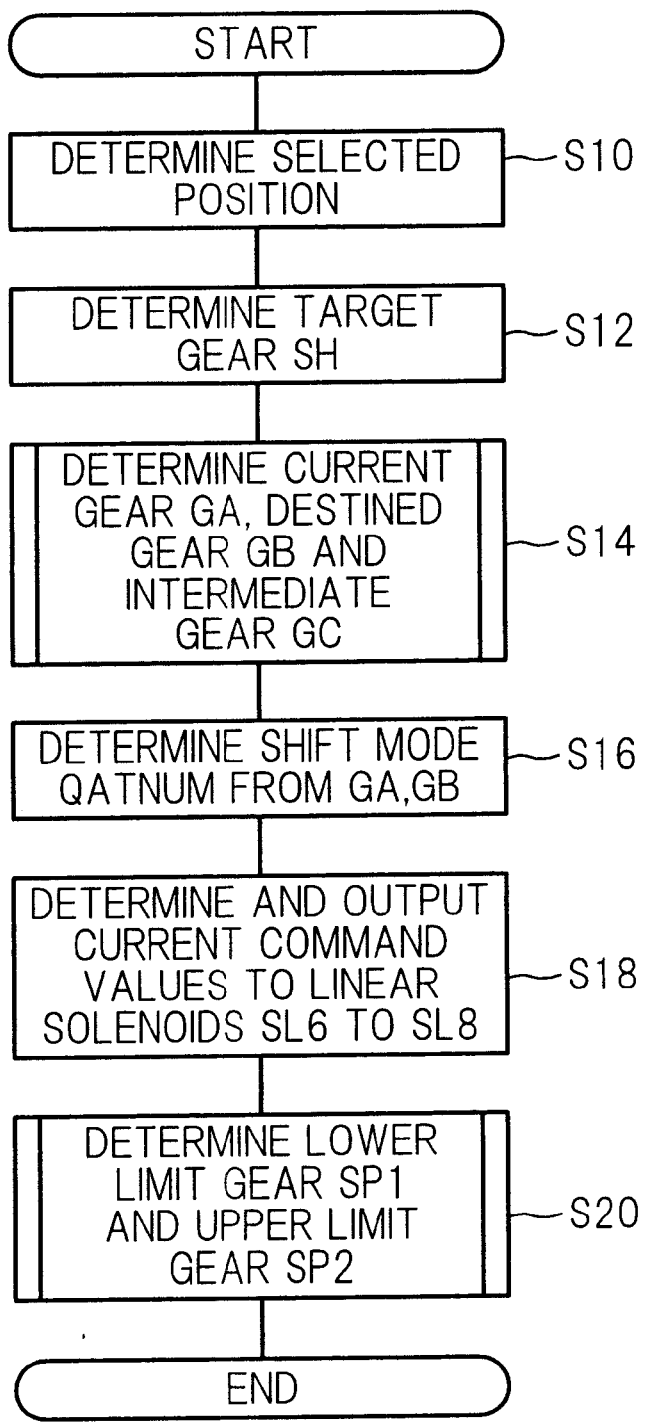
FIG. 2 is a main flow chart showing the operation of the system illustrated in FIG. 1.

FIG. 2 is a flow chart showing the operation of the system. The program illustrated here is executed once every 10 msec.

Explaining this, the program begins in S10 in which the position of the shift lever 54 is determined from the output of the shift lever position switch 68, in other words, it is determined which of the eight positions the vehicle operator selects.

The program proceeds to S12 in which a known shift map (shift scheduling map; not shown) is retrieved using the detected vehicle speed V and the throttle opening TH, and based on the result of retrieval and the position determined in S10, a target gear (to be engaged with or shifted to) SH is determined in a range defined by a lower limit gear SP1 and an upper limit gear SP2, and based thereon, a shift command is outputted. The target gear SH is determined to 0 when the position is N (neutral), to 1 to 5 corresponding to the retrieved one of 1st to 5th forward gears when the position is other than N and R, and to 6 when the position is R (reverse).

The program proceeds to S14 in which the current gear (now being engaged) GA, the destined gear (to be engaged to next) GB, and an intermediate gear GC (between the current gear GA and the destined gear GB) are determined based on the target gear SH (determined in S12) and an input/output rotational speed ratio GRATIO.

The intermediate gear GC indicates a gear positioned between the current gear GA and the destined gear GB in the jumping shift and in case of downshifting from 4th to 2nd, for example, it is 3rd. Since no intermediate gear exists in a normal successive (one-gear) shift, GC will be determined to be the destined gear GB as will be explained later. The input/output rotational speed ratio GRATIO is a table-retrieval value obtained by retrieving a table (whose characteristic is not shown) by a ratio between the input rotational speed Nm and the output rotational speed Nc.

Figure 3:
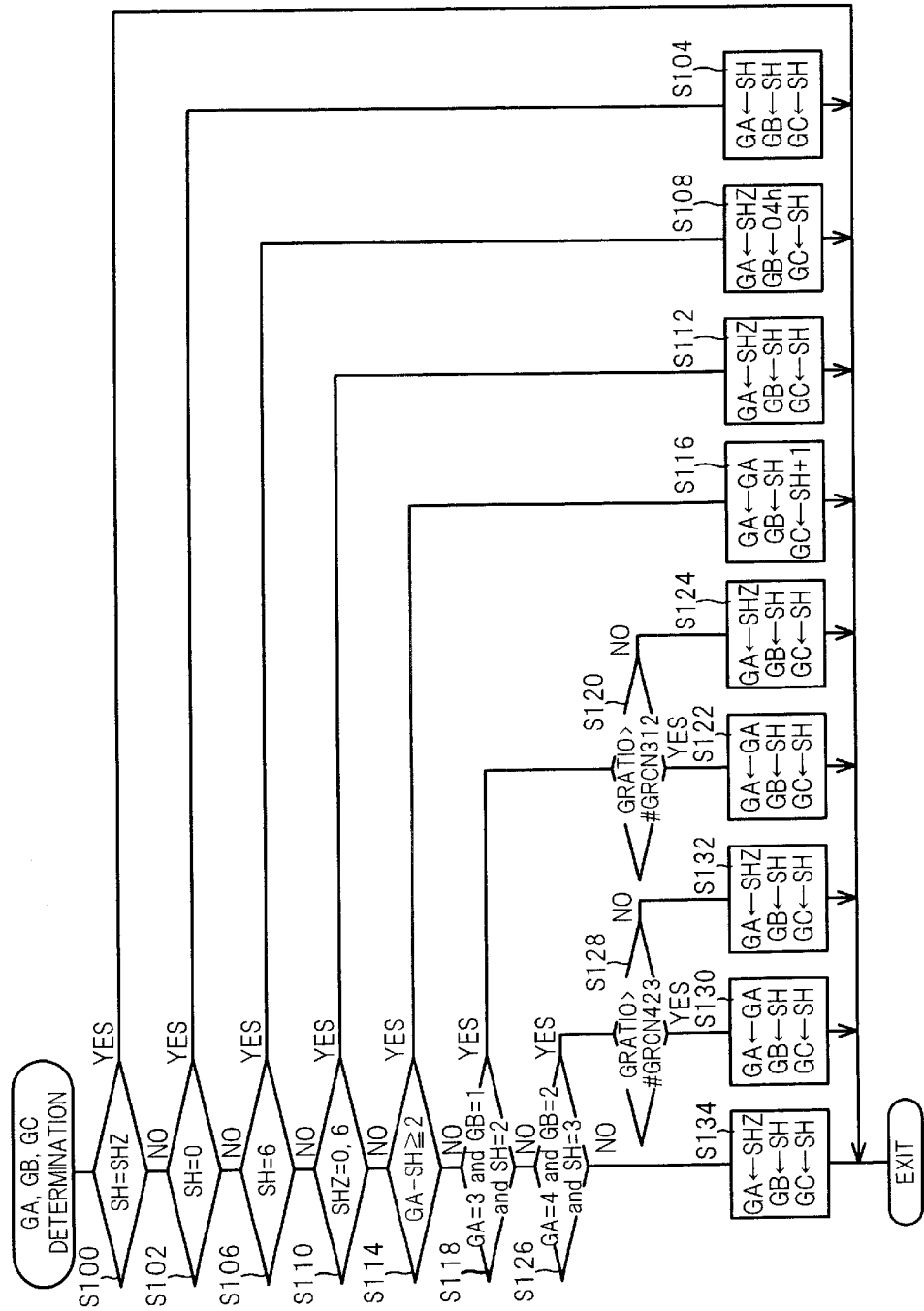
FIG. 3 is a flow chart showing the subroutine for determining a current gear GA, a destined gear GB and an intermediate gear GC referred to in the flow chart of FIG. 2.

FIG. 3 is a flow chart showing the subroutine of the processing in S14.

The program begins in S100 in which it is determined whether the determined target gear SH is the same as a last target gear (named "SHZ" which is the target gear in the last cycle, i.e., last program loop of the flow chart of FIG. 2). In other words, it is determined whether the shift is not required. When the result is affirmative, since this indicates that the determination of the destined gear GB is not needed, the program is immediately terminated.

When the result in S100 is negative, since the shift is required, the program proceeds to S102 in which it is determined whether the target gear SH is 0 (i.e., the position is neutral). When the result is affirmative, the program proceeds to S104 in which the current gear GA, the destined gear GB and the intermediate gear GC are all determined to be the target gear SH, and the program is terminated.

When the result in S102 is negative, the program proceeds to S106 in which it is determined whether the target gear SH is 6, i.e., it is determined whether the reverse gear is required. When the result is affirmative, the program proceeds to S108 in which the current gear GA is determined to be the last target gear SHZ, the destined gear GB is determined to 04h (in the shift mode explained later) and the intermediate gear GC is determined to be the target gear SH, and the program is terminated.

When the result in S106 is negative, the program proceeds to S110 in which it is determined whether the last target gear SHZ is 0 or 6. Since it is determined in S100 that the shift is required and it is determined in S102 and S106 the desired at the current cycle is neither the neutral position nor reverse gear, the judgement in S110 means to determine whether in-gear to any of 1st to 5th forward gears is required. When the result in S110 is affirmative, the program proceeds to S112 in which the current gear GA is determined to be the last target gear SHZ, and the destined gear GB and the intermediate gear GC are determined to be the (current) target gear SH, and the program is terminated.

When the result in S110 is negative, in other words, when it is the shift from one forward gear to another, the program proceeds to S114 in which it is determined whether the difference between the current gear GA and the target gear S H is greater than or equal to 2, in other words, it is determined whether a jumping shift is required. When the result is affirmative, the program proceeds to S116 in which the destined gear GB is determined to be the target gear SH, and the intermediate gear GC is determined to be a gear obtained by adding one to the target gear SH, i.e., a gear higher than the target gear SH by one.

The current gear GA is not changed. This is because the jumping shift is determined whether successive shift requirement (command) such as from 4th to 3rd, from 3rd to 2nd, for example, can be done within a predetermined period of time, and in response thereto, the target gear SH is changed from 3rd to 2nd, for example. As a result, if the current gear GA (e.g., 4th) is determined to be the last target gear SHZ (e.g., 3rd), they will not be equal. For this reason, the current gear GA remains unchanged.

When the result in S14 is negative, since this indicates the shift is an ordinary one-gear shift, the program proceeds to S118 in which it is determined whether the current gear GA is 3rd, the destined gear GB is 1st (low) and the target gear SH is 2nd. In other words, it is determined whether the jumping shift from 3rd to 1st (i.e. two-gear downshifting) is in progress and the current target gear SH is 2nd. Specifically, it is determined whether the change to 2nd is required when the jumping shift from 3rd to 1st is in progress.

Figure 4:
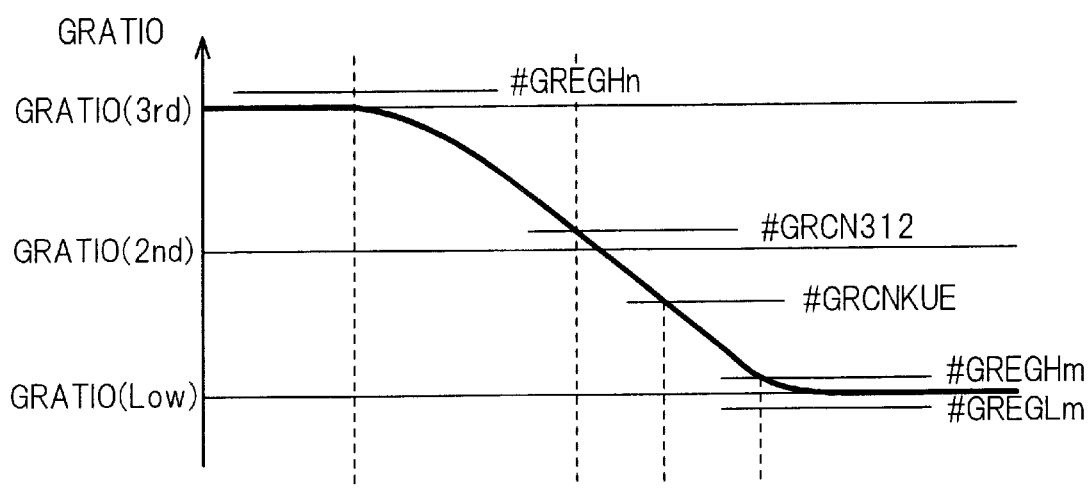
FIG. 4 is a time chart showing the relationship between a degree of shift progress (GRATIO) and a threshold value to be compared therewith, referred to in the flow chart of FIG. 3.

When the result in S118 is affirmative, the program proceeds to S120 in which it is determined whether the input/output rotational speed ratio GRATIO is greater than a predetermined input/output rotational speed ratio #GRCN312 illustrated in FIG. 4.

The GRATIO is the table-retrieval value obtained by retrieving the table by the ratio between the input rotational speed Nm and the output rotational speed Nc, as mentioned above. Accordingly, the ratio GRATIO converges within a certain range determined from each gear when the clutch concerned is fully engaged, while the ratio GRATIO varies in response to the progress during the shift. Thus, the ratio GRATIO can act as an index indicative of the degree of shift progress. Using this ratio GRATIO, it becomes possible to accurately determine the progress of shift events, without depending on a time lapse since the beginning of the shift.

As will be understood from the above and FIG. 4, the determination in S120 is to determine whether the jumping shift from 3rd to 1st has not reached a predetermined degree of shift progress (i.e., the predetermined input/output rotational speed ratio #GRCN312).

When the result in S120 is affirmative, the program proceeds to S122 in which the destined gear GB and the intermediate gear GC are determined to be the target gear SH. The current gear GA is kept unchanged. The processing in S122 indicates that the jumping shift from 3rd to 1st is changed to the ordinary one-gear shift from 3rd to 2nd.

On the other hand, when the result in S120 is negative, in other words, when the jumping shift from 3rd to 1st has reached or exceeds the predetermined degree of shift progress, the program proceeds to S124 in which the current gear GA is determined to be the last target gear SHZ and the destined gear GB and the intermediate gear GC are determined to be the target gear SH, and the program is terminated. In this case, the last target gear SHZ is 1st, since the destined gear GB before rewritten was 1st. Thus, the jumping shift from 3rd to 1st is changed to the ordinary one-gear shift (upshifting) from 3rd to 2nd in the processing in S124.

To be more specific, if the target gear SH is changed to 2nd when the jumping shift from 3rd to 1st is in progress, 2nd gear can be established by downshifting from 3rd to 2nd or by upshifting from 1st to 2nd. As will be understood from the above, the predetermined input/output rotational speed ratio #GRCN312 acts as a threshold value for determining which way should be selected. For that reason, the predetermined input/output rotational speed ratio #GRCN312 is set to a value corresponding to a maximum degree of shift progress in which the one-gear downshifting from 3rd to 2nd during the jumping shift from 3rd to 1st, is still possible.

When the result in S118 is negative, the program proceeds to S126 in which it is determined whether the current gear ratio GA is 4th, the destined gear GB is 2nd and the target gear SH is 3rd. Specifically, it is determined whether the jumping downshifting from 4th to 2nd is in progress and the current target gear is 3rd. More specifically, it is determined whether the target gear is changed to 3rd during the jumping downshifting from 4th to 2nd.

Figure 5:
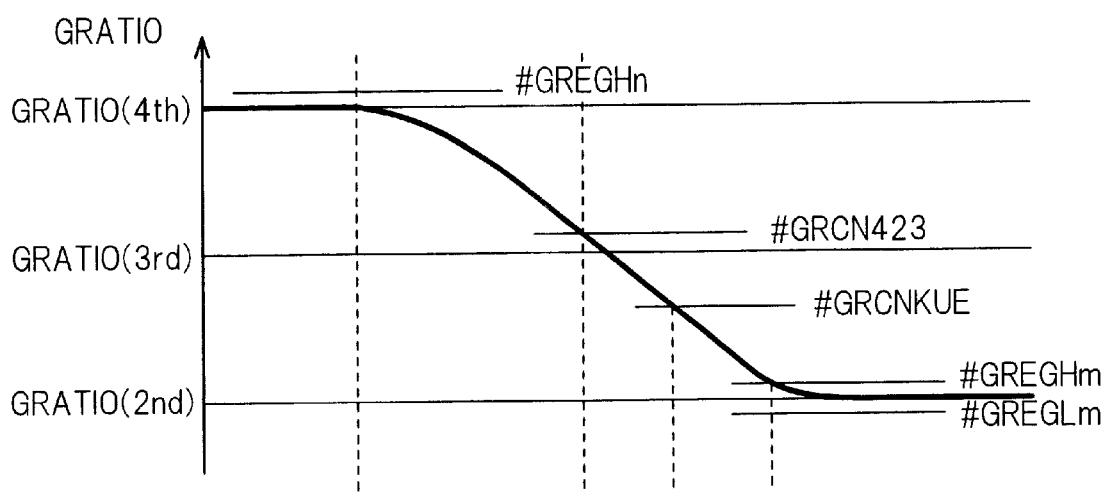
FIG. 5 is a time chart similarly showing the relationship between the degree of shift progress (GRATIO) and another threshold value to be compared therewith, referred to in the flow chart of FIG. 3.

When the result in S126 is affirmative, the program proceeds to S128 in which it is determined whether the input/output rotational speed ratio GRATIO is greater than a predetermined input/output rotational speed ratio #GRCN423 (illustrated in FIG. 5). The predetermined input/output rotational speed ratio #GRCN423 is a threshold value set in a manner similar to the aforesaid #GRCN312.

When the result in S128 is affirmative, the program proceeds to S130 in which the destined gear GB and the intermediate gear GC are determined to be the target gear SH, while the current gear GA is kept unchanged such that the jumping downshifting from 4th to 2nd is changed to one-gear downshifting from 4th to 3rd in the manner similar to that in S122.

On the other hand, when the result in S128 is negative, the program proceeds to S132 in which the current gear GA is determined to be the last target gear SHZ, and the destined gear GB and the intermediate gear GC are determined to be the target gear SH, in a manner similar to that in S124, such that the jumping downshifting from 4th to 2nd is changed to one-gear upshifting from 2nd to 3rd.

Thus, during the jumping shift, more specifically, during the two-gear downshifting, when the change of the destined gear GB (i.e., target gear SH) is required, the input/output rotational speed ratio GRATIO (indicative of the degree of shift progress) is compared with the predetermined input/output rotational speed ratio #GRCN312 or #GRCN423 and based on the result of comparison, it is determined how the new destined gear GB should be established. In other words, based on the result of comparison, the shift mode QATNUM is determined. With this, it becomes possible to improve the response to the destined gear change during two-gear downshifting.

When the result in S126 is negative, in other words, when the shift is a normal one-gear downshifting or upshifting, the program proceeds to S134 in which the current gear GA is determined to be the last target gear SHZ and the destined gear GB and the intermediate gear GC are determined to be the (current) target gear SH.

Returning to the explanation of the flow chart of FIG. 2, the program proceeds to S16 in which the shift mode QATNUM is determined based on the determined current gear GA and the destined gear GB.

The shift mode QATNUM is prepared in a memory of the RAM 86 (or ROM 84) and indicates the mode of shift. Specifically, it is expressed, for example, as 11h (indicating upshifting from 1st to 2nd, i.e., current gear GA is 1st and the destined gear GB is 2nd), 12h (indicating upshifting from 2nd to 3rd), 13h (indicating upshifting from 3rd to 4th), 21h (indicating one-gear downshifting from 2nd to 1st), 22h (indicating one-gear downshifting from 3rd to 2nd), 23h (indicating one-gear downshifting from 4th to 3rd), 25h (indicating two-gear downshifting from 4th to 2nd), 31h (indicating that 1st gear should be held). More specifically, the first numeral of the shift mode QATNUM indicates the mode of shift as 1: upshifting, 2: downshifting and 3: holding current gear. The shift mode QATNUM is solely determined from the current gear GA and the destined gear GB determined in S14.

The program then proceeds to S18 in which current command values (manipulated variables) to the linear solenoids SL6 to SL8 are determined and outputted in response to the shift mode QATNUM determined in S16.

Figure 6:
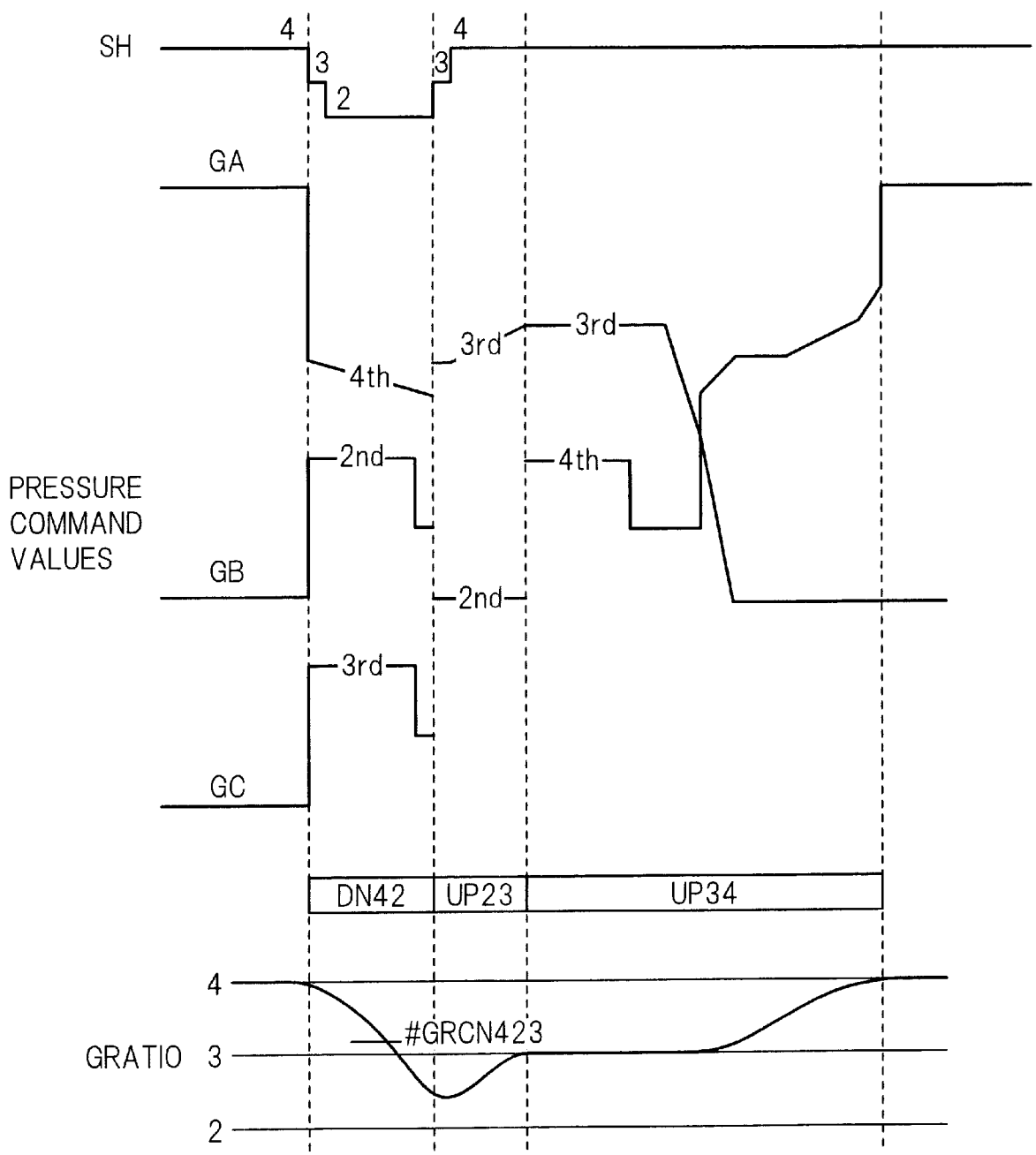
FIG. 6 is a time chart showing the relationship between the degree of shift progress (GRATIO) and hydraulic pressure command values to be supplied to clutches.

This will be briefly explained with reference to a time chart of FIG. 6. This figure illustrates a situation in which, during the two-gear downshifting from 4th to 2nd, the target gear SH is successively changed to 3rd and then to 4th in the direction of upshifting. For ease of understanding, instead of the current command values to the linear solenoids SL6 to SL8, (hydraulic) pressure command value to the clutch of the gears concerned are illustrated. The hydraulic command value is one of the parameters based on which the current command value is determined.

In case of the two-gear downshifting from 4th to 2nd (illustrated as "DN42" in the figure), the oil supplied to the clutch of the current gear GA (4th), more precisely the fourth-gear/reverse hydraulic) clutch C4R should be decreased, while that of the clutch C2 for the destined gear GB (2nd) should be increased. At the same time, the clutch C3 for the intermediate gear GC (3rd; referred to as in S116 in the flow chart of FIG. 3) should also be increased.

Then, when the input/output rotational speed ratio GRATIO becomes less than the predetermined input/output rotational speed ratio #CRCN423, if the target gear SH is changed from 2nd to 3rd, the two-gear downshifting from 4th to 2nd is changed to one-gear upshifting from 2nd to 3rd (illustrated as "UP23" in the figure) through the processing in S128 and S132. In other words, the destined gear GB is changed from 2nd to 3rd.

In this situation, since the clutch C3 for the intermediate gear GC (3rd) in the two-gear downshifting from 4th to 2nd has been increasing as mentioned above, it becomes possible to effect immediate change to the upshifting from 2nd to 3rd, and to shorten time necessary for supplying oil to a level at which the 3rd gear clutch C3 is completely engaged. Thus, by controlling the supply of oil to the three clutches for the current gear GA, the destined gear GB and the intermediate gear GC in the two-gear downshifting, it becomes possible to improve the response to the change of the destined gear while the two-gear downshifting is in progress.

As regards the further changing the upshifting from 3rd to 4th (illustrated as "UP34" in the figure), it suffices to complete the shift if the supply of oil to the clutch C3 for the 3rd gear is decreased, while that of the clutch C4R for the 4th gear is increased, as is experienced in an normal one-gear shift.

In the above, the calculation of the hydraulic command values to the gears concerned and the determination of the current command values to the linear solenoids SL6 to SL8 based on the calculation of the hydraulic command values are omitted, since they do not have direct relationship with the gist of the present invention.

Again returning to the explanation of the flow chart of FIG. 2, the program proceeds to S20 in which the lower limit gear SPI and upper limit gear SP2 are determined.

Figure 7:
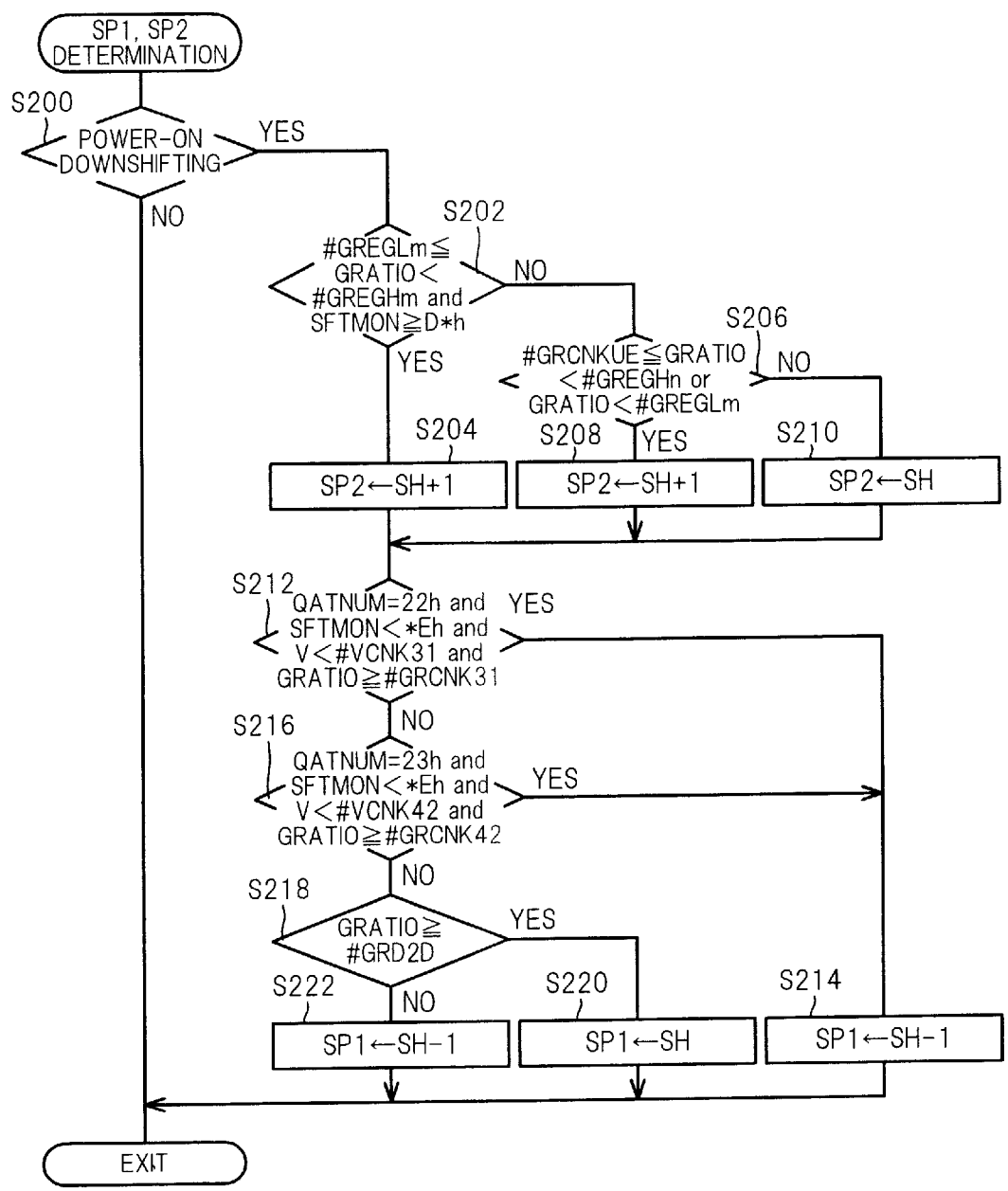
FIG. 7 is a flow chart showing the subroutine for determining a lower limit gear SP1 and an upper limit gear SP2 referred to in the flow chart of FIG. 2.

FIG. 7 is a flow chart showing the subroutine for this.

The program begins in S200 in which it is determined whether it is a power-on downshifting. The "power-on downshifting" indicates a downshifting with the accelerator pedal being depressed (i.e., the so-called "kick-down"). When the result is negative, the program is immediately terminated.

On the other hand, when the result is affirmative, the program proceeds to S202 in which it is determined whether the input/output rotational speed ratio GRATIO is greater than or equal to a predetermined input/output rotational speed ratio #GREGLm, but is less than a predetermined input/output rotational speed ratio #GREGHm (both illustrated in FIGS. 4 and 5), and in addition, SFTMON (illustrated in FIG. 8) is greater than or equal to D* h.

Here, as will be understood from FIGS. 4 and 5, the situation that the input/output rotational speed ratio GRATIO is greater than or equal to the predetermined input/output rotational speed ratio #GREGLm, but is less than the predetermined input/output rotational speed ratio #GREGHm, indicates that the input/output rotational speed ratio GRATIO converges within a predetermined (certain) range. As mentioned above, since the input/output rotational speed ratio GRATIO converges within the predetermined (certain) range when the clutch is completely engaged, this indicates that the clutch is completely engaged.

In the above, the suffix "m" of the input/output rotational speed ratios #GREGLm and #GREGHm indicates the destined gear GB. Similarly, in a predetermined input/output rotational speed ratio #GREGHn (referred to later), the suffix "n" indicates the current gear GA. For example, in FIG. 4, m is 1st and n is 3rd.

Figure 8:
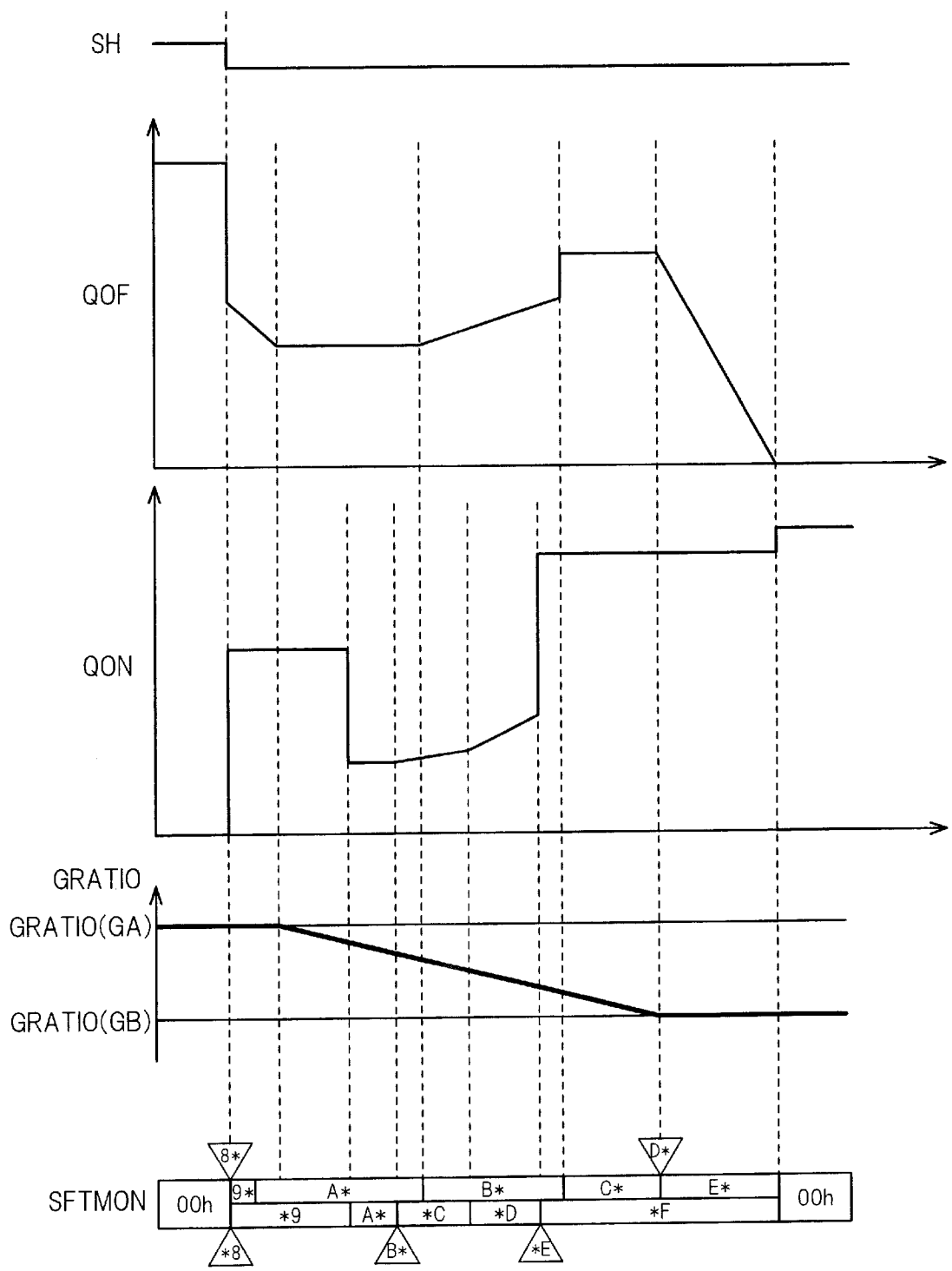
FIG. 8 is a time chart showing time points for controlling shift in the system illustrated in FIG. 1.

The SFTMON is a group of values prepared in a memory of the RAM 86 (or ROM 84) as mentioned above and each indicates the time points of the shift control as will be seen from FIG. 8. Specifically, if SFTMON is D* h, this indicates the time point at which the hydraulic pressure supplied to the clutch to be engaged (illustrated as "QON" in the figure) has sufficiently risen, while that supplied to the clutch to be disengaged (illustrated as "QOF" in the figure) has begun dropping, i.e., the time point at which the shift has finished in the sense of hydraulic pressure. In the SFTMON in the figure, the upper values indicate the time points in the clutch disengaging control and the lower values indicate those in the clutch engaging control.

Returning to the explanation of the flow chart of FIG. 7, when the result in S202 is affirmative, when it is determined that the shift has finished from GRATIO and SFTMON, the program proceeds to S204 in which the upper limit gear SP2 is determined to be a gear obtained by adding one to the target gear SH. The upper limit gear SP2 indicates a highest (greatest) gear of the target gear SH possibly determined in S12 in a next program loop of the FIG. 2 flow chart. Accordingly, the processing in S204 indicates that in a next program loop it is permitted to determine the target gear SH one gear higher than the current one, in other words, it is permitted to change the destined gear GB to be a gear higher by one.

On the other hand, when the result in S202 is negative, the program proceeds to S206 in which it is determined whether the input/output rotational speed ratio GRATIO is greater than or equal to a predetermined input/output rotational speed ratio #GRCNKUE, but is less than the predetermined input/output rotational speed ratio #GREGHn (both illustrated in FIGS. 4 and 5), or the input/output rotational speed ratio GRATIO is less than the predetermined input/output rotational speed ratio #GREGLm.

Since QON or QOF (illustrated in FIG. 8) varies greatly at time phases starting from the end of the torque phase to the inertia phase, the determination in S206 corresponds to determine whether the degree of shift progress (GRATIO) is not at the region where the hydraulic pressure varies greatly.

When the result in S206 is affirmative, the program proceeds to S208 in which the upper limit gear SP2 is determined to be the target gear SH plus one, similarly to S204. Here, this indicates that the change of the destined gear GB during shift is permitted.

On the other hand, when the result in S206 is negative, since this indicates that the degree of shift progress is at the region where the hydraulic pressure varies greatly, the program proceeds to S210 in which the upper limit gear SP2 is determined to be the target gear SH, in other words, in a next program loop it is inhibited to determine the destined gear GB to be a gear higher than one (or more).

Figure 9:
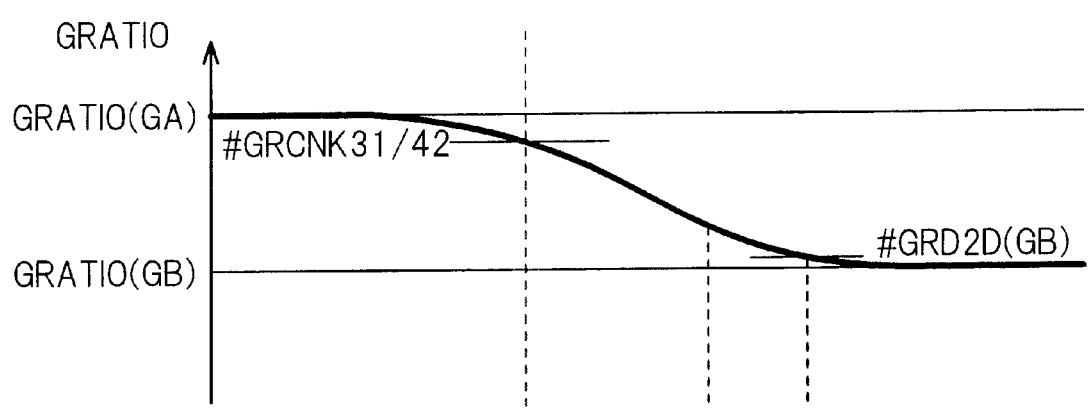
FIG. 9 is a time chart similarly showing the relationship between the degree of shift progress (GRATIO) and still another threshold value to be compared therewith, referred to in the flow chart of FIG. 7.

The program then proceeds to S212 in which it is determined whether the value of the shift mode QATNUM is 22h (indicative of one-gear downshifting from 3rd to 2nd), the value of the SFTMON is less than * Eh, the vehicle speed V is less than a predetermined vehicle speed #VCNK31, and the input/output rotational speed ratio GRATIO is greater than or equal to a predetermined input/output rotational speed ratio #GRCNK31 (illustrated in FIG. 9).

Here, the fact that the SFTMON is less than * Eh indicates that it is a time point at which the hydraulic pressure QON increases sharp, in other words, it is the time point at which the hydraulic pressure of the clutch of the destined gear GB is about to reach the engageable pressure. And, the predetermined vehicle speed #VCNK31 indicates a maximum vehicle speed in which the engine E does not rev excessively when the two-gear downshifting (jumping shift) is effected. The predetermined input/output rotational speed ratio #GRCNK31 is a threshold value to discriminate whether a further change of the destined gear GB to a gear lower by one, i.e., the two-gear downshifting should be permitted.

When the result in S212 is affirmative, the program proceeds to S214 in which the lower limit gear SP1 is determined to be a gear obtained by subtracting one from the target gear SH. The lower limit gear SP1 indicates a lowest (smallest) gear of the target gear SH possibly determined in S12 in a next program loop of the FIG. 2 flow chart. Accordingly, the processing in S214 indicates that in a next program loop it is permitted to determine the target gear SH one gear lower than the current one, in other words, it is permitted to change the destined gear GB to be a gear lower by one. More specifically, this processing indicates that the change of the destined gear GB during shift, i.e., two-gear downshifting from 3rd to 1st is permitted.

On the other hand, when the result in S212 is negative, the program proceeds to S216 in which it is determined whether the value of the shift mode QATNUM is 23h (one gear downshifting from 4th to 3rd), the value of SFTMON is less than *Eh, the vehicle speed V is less than a predetermined vehicle speed #VCNK42, and the input/output rotational speed ratio GRATIO is greater than or equal to a predetermined value #GRCNK42 (illustrated in FIG. 9). The predetermined vehicle speed #VCNK42 and the predetermined value #GRCNK42 are threshold values each predetermined in a manner similar to the aforesaid values #VCNK31 and #GRCNK31.

When the result in S216 is affirmative, the program proceeds to S214 in which the lower limit gear SP1 is determined to be a gear obtained by subtracting one from the target gear SH indicating that the two-gear downshifting from 4th to 2nd is permitted.

On the other hand, when the result in S216 is negative, the program proceeds to S218 in which it is determined whether the input/output rotational speed ratio GRATIO is greater than or equal to a predetermined input/output rotational speed ratio #GRD2D (illustrated in FIG. 9 and predetermined in a manner similar to #GREGHm). When the result is affirmative, the program proceeds to S220 in which the lower limit gear SP1 is determined to be the target gear SH. With this, in a next program loop, it is inhibited to change the destined gear GB to a gear lower by one, for the reason mentioned with reference to S210.

When the result in S218 is negative, the program proceeds to S222 in which the lower limit gear SH1 is determined to be SH-1 in the same manner as in S214. Since it is determined that the shift has finished, this indicates that the normal one-gear downshifting is permitted.

Thus, it is inhibited to change the target gear SH (destined gear GB), i.e., to determine the target gear SH to a gear different from the current one in the region where the hydraulic pressure varies greatly, while the change of the target gear including two-gear downshifting is permitted in the other region. With this, it becomes possible to improve the response to the change of the destined gear GB during shift and the feeling experienced by the vehicle occupant, and to prevent the clutches from being degraded.

Further, since the two-gear downshifting is inhibited when the vehicle speed is greater than or equal to the predetermined vehicle speeds, it becomes possible to protect the engine E. The two-gear downshifting from a high vehicle speed is likely to degrade the clutches, since the dragging torque at the clutch to be disengaged becomes great. However, this configuration can also solve this problem.

It should be noted that, although the predetermined input/output rotational speed ratios #GREGHm, #GREGLm, #GREGHn, #GRCNKUE and #GRD2Dn are explained with reference to a specific shift, they are, in fact, determined separately for shift mode QATNUM, more specifically, they are determined separately for any of the following shift mode QATNUM (for downshifting):

21h (one-gear downshifting from 2nd to 1st)
22h (one-gear downshifting from 3rd to 2nd)
23h (one-gear downshifting from 4th to 3rd)
24h (one-gear downshifting from 5th to 4th)
25h (two-gear downshifting from 4th to 2nd)
26h (two-gear downshifting from 3rd to 1st)

In this embodiment, thus, if the change of the destined gear GB (i.e., the target gear SH) is required when the jumping shift, i.e., two-gear downshifting is in progress, the input/output rotational speed ratio GRATIO (indicative of degree of shift progress) is compared with the predetermined input/output rotational speed ratio #GRCN312 or #GRCN423, and based on the result of comparison, how the shift to establish or effect the required destined gear GB, i.e., the shift mode QATNUM is determined, thereby enabling to improve or enhance the response to the change of the destined gear GB during two-gear downshifting.

Further, since the supply of oil to the three clutches for the current gear GA, the destined gear GA and the intermediate gear GC are controlled during the two-gear downshifting, the response to the change of the destined gear GB during the shift is further improved.

The embodiment is thus configured to have a system for controlling an automatic transmission (T) of a vehicle (1) having an input shaft (MS) connected to an internal combustion engine (E) mounted on the vehicle and an output shaft (CS) connected to driven wheels (W) of the vehicle, the transmission transmitting input torque, through any of frictional engaging elements (clutches Cn), generated by the engine and inputted by the input shaft to the driven wheels by the output shaft, comprising; destined gear GB (target gear SH) retrieving means (ECU 80, S10, S12) for retrieving a destined gear to be engaged to in accordance with predetermined shift scheduling map based on detected operating conditions of the vehicle and the engine (vehicle speed V and the throttle opening TH) in response to a shift command; shift mode determining means (ECU 80, S14, S16) for determining a shift mode QATNUM based on the destined gear GB and a current gear GA currently engaged, such that the destined gear is established; hydraulic pressure command value determining means (ECU 80, S18) for determining hydraulic pressure command value to be supplied to any of the frictional engaging elements, more precisely, for determining current command values to linear solenoids SL6 to SL8 of the clutches concerned) based on the determined shift mode; degree of shift progress detecting means (first and second rotational speed sensors 64, 66, ECU 80) for detecting a degree of shift progress (input/output rotational speed ratio GRATIO) in shifting from the current gear to the destined gear; destined gear change possibility determining means (ECU 80, S20, S200, S202, S206, S212, S216, S218) for determining, if the shifting from the current gear to the destined gear is downshifting, whether change of the destined gear is possible when the downshifting is in progress, by comparing the degree of shift progress with a predetermined first threshold value (predetermined input/output rotational speed ratios #GREGHm, #GREGLm, #GREGHn, #GRCNKUE and #GRD2Dn); destined gear change permission determining means (ECU 80, S20, S204, S208, S214, S220, S222) for determining a permission of the change of the destined gear when the change of the destined gear is determined to be possible; and destined gear determining means (ECU 80, S12) for determining the destined gear GB (target gear SH) based on the permission of the change of the destined gear. In the system, the shift mode determining means includes: second threshold value comparing means (ECU 80, S14, S120, S128) for comparing the degree of shift progress with a predetermined second threshold value, when the downshifting is two-gear downshifting (S14, S114); and determines the shift mode such that the destined gear is established in an upshifting direction (ECU 80, S14, S122, S124, S130, S132, S16)

In the system, the degree of shift progress is a ratio of the rotational speeds of the input shaft and the output shaft (GRATIO). The system further includes: intermediate gear determining means (ECU 80, S14, S100 to S134) for determining an intermediate gear GC between the current gear GA and the destined gear GB; and the hydraulic pressure command value determining means determines the hydraulic pressure command values to be supplied to the frictional engaging elements of the current gear, the destined gear and the intermediate gear based on the determined shift mode.

The system further includes: vehicle speed comparing means (ECU 80, S20, S212, S216) for comparing a speed of the vehicle (V) with a predetermined vehicle speed (#VCNK31, #VCNK42); and two-gear down shifting inhibiting means (ECU 80, S214) for inhibiting the two-gear downshifting when the speed of the vehicle is greater than or equal to the predetermined vehicle speed. In the system the vehicle speed comparing means compares the speed of the vehicle with the predetermined vehicle speed, when the downshifting is a downshifting with an accelerator being depressed (i.e, power-one downshifting; S200).

It should be noted in the above, although the two-gear downshifting is explained with reference to that from 4th to 2nd and that from 3rd to 1st, it is alternatively possible to add a two-gear downshifting from 5th to 3rd.

It should also be noted that, although any of eight positions comprising P, R, N, D5, D4, D3, 2 and 1 is selected through the shift lever 54, it is alternatively possible to provide a switch or lever to the shift lever 54 or independently of the shift lever 54 such that the vehicle operator can manually require shift (upshifting or downshifting). If such a manual shifting mechanism is installed, it will be sufficient if the target gear SH is solely determined based on the requirement from the vehicle operator, irrespectively of the vehicle speed V and the throttle opening TH.

The entire disclosure of Japanese Patent Application No. 2000-32414 filed on Oct. 24, 2000, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling an automatic transmission of a vehicle having an input shaft connected to an internal combustion engine mounted on the vehicle and an output shaft connected to driven wheels of the vehicle, the transmission transmitting input torque, through any of frictional engaging elements, generated by the engine and inputted by the input shaft to the driven wheels by the output shaft, comprising;

destined gear retrieving means for retrieving a destined gear to be engaged to in accordance with predetermined shift scheduling map based on detected operating conditions of the vehicle and the engine in response to a shift command;

shift mode determining means for determining a shift mode based on the destined gear and a current gear currently engaged, such that the destined gear is established;

hydraulic pressure command value determining means for determining hydraulic pressure command value to be supplied to any of the frictional engaging elements based on the determined shift mode;

degree of shift progress detecting means for detecting a degree of shift progress in shifting from the current gear to the destined gear;

destined gear change possibility determining means for determining, if the shifting from the current gear to the destined gear is downshifting, whether change of the destined gear is possible when the downshifting is in progress, by comparing the degree of shift progress with a predetermined first threshold value;

destined gear change permission determining means for determining a permission of the change of the destined gear when the change of the destined gear is determined to be possible; and destined gear determining means for determining the destined gear based on the permission of the change of the destined gear;

wherein:

the shift mode determining means includes:

second threshold value comparing means for comparing the degree of shift progress with a predetermined second threshold value, when the downshifting is two-gear downshifting;

and determines the shift mode such that the destined gear is established in an upshifting direction.

2. A system according to claim 1, wherein the degree of shift progress is a ratio of the rotational speeds of the input shaft and the output shaft.

3. A system according to claim 1, further including:

intermediate gear determining means for determining an intermediate gear between the current gear and the destined gear;

and the hydraulic pressure command value determining means determines the hydraulic pressure command values to be supplied to the frictional engaging elements of the current gear, the destined gear and the intermediate gear based on the determined shift mode.

4. A system according to claim 1, further including:

vehicle speed comparing means for comparing a speed of the vehicle with a predetermined vehicle speed; and two-gear down shifting inhibiting means for inhibiting the two-gear downshifting when the speed of the vehicle is greater than or equal to the predetermined vehicle speed.

5. A system according claim 4, wherein the vehicle speed comparing means compares the speed of the vehicle with the predetermined vehicle speed, when the downshifting is a downshifting with an accelerator being depressed.

6. A method of controlling an automatic transmission of a vehicle having an input shaft connected to an internal combustion engine mounted on the vehicle and an output shaft connected to driven wheels of the vehicle, the transmission transmitting input torque, through any of frictional engaging elements, generated by the engine and inputted by the input shaft to the driven wheels by the output shaft, comprising the steps of;

(a) retrieving a destined gear to be engaged to in accordance with predetermined shift scheduling map based on detected operating conditions of the vehicle and the engine in response to a shift command;

(b) determining a shift mode based on the destined gear and a current gear currently engaged, such that the destined gear is established;

(c) determining hydraulic pressure command value to be supplied to any of the frictional engaging elements based on the determined shift mode;

(d) detecting a degree of shift progress in shifting from the current gear to the destined gear;

(e) determining, if the shifting from the current gear to the destined gear is downshifting, whether change of the destined gear is possible when the downshifting is in progress, by comparing the degree of shift progress with a predetermined first threshold value;

(f) determining a permission of the change of the destined gear when the change of the destined gear is determined to be possible; and (g) determining the destined gear based on the permission of the change of the destined gear;

wherein:
   the step (b) includes:
      (h) comparing the degree of shift progress with a predetermined second threshold value, when the downshifting is two-gear downshifting;
      and determines the shift mode such that the destined gear is established in an upshifting direction.

7. A method according to claim 6, wherein the degree of shift progress is a ratio of the rotational speeds of the input shaft and the output shaft.

8. A method according to claim 6, further including the step of:

(i) determining an intermediate gear between the current gear and the destined gear;

and the step (c) determines the hydraulic pressure command values to be supplied to the frictional engaging elements of the current gear, the destined gear and the intermediate gear based on the determined shift mode.

9. A method according to claim 6, further including steps of:

(j) comparing a speed of the vehicle with a predetermined vehicle speed; and (k) inhibiting the two-gear downshifting when the speed of the vehicle is greater than or equal to the predetermined vehicle speed.

10. A method according claim 9, wherein the step (j) compares the speed of the vehicle with the predetermined vehicle speed, when the downshifting is a downshifting with an accelerator being depressed.

* * * * *